United States Patent [19]
Cybularz et al.

[11] Patent Number: 5,924,844
[45] Date of Patent: Jul. 20, 1999

[54] DISSOLVED GAS AUGMENTATION WITH MIXING CHAMBERS

[75] Inventors: Joseph M. Cybularz; Richard K. Fisher, Jr., both of Jacobus; Gary F. Franke; Robert G. Grubb, both of York, all of Pa.

[73] Assignee: Voith Hydro, Inc., York, Pa.

[21] Appl. No.: 09/174,695

[22] Filed: Oct. 19, 1998

Related U.S. Application Data

[62] Division of application No. 08/805,286, Feb. 25, 1997, Pat. No. 5,823,740.

[51] Int. Cl.$^6$ .................................................... F04D 29/38
[52] U.S. Cl. ............................................. 415/115; 415/1
[58] Field of Search .................................... 415/114, 115, 415/116–17

[56] References Cited

U.S. PATENT DOCUMENTS

| | | |
|---|---|---|
| 2,416,268 | 2/1947 | Nagler . |
| 2,988,154 | 6/1961 | Hub . |
| 3,044,744 | 7/1962 | Berlyn . |
| 3,081,975 | 3/1963 | Sproule et al. . |
| 3,132,839 | 5/1964 | Haekal ..................................... 415/115 |
| 3,172,640 | 3/1965 | Sproule . |
| 3,174,719 | 3/1965 | Sproule et al. . |
| 3,188,050 | 6/1965 | Koeller . |
| 3,220,696 | 11/1965 | Chatfield et al. . |
| 3,236,499 | 2/1966 | Chatfield et al. . |
| 3,239,193 | 3/1966 | Kerensky . |
| 3,246,874 | 4/1966 | Sproule . |
| 3,253,816 | 5/1966 | Sproule . |
| 3,398,696 | 8/1968 | Sproule . |
| 3,405,913 | 10/1968 | Chatfield et al. . |
| 3,612,713 | 10/1971 | Eggins et al. . |
| 3,635,582 | 1/1972 | Sproule . |
| 3,724,966 | 4/1973 | Sproule . |
| 3,898,016 | 8/1975 | Kanger . |
| 4,228,753 | 10/1980 | Davis et al. .............................. 415/115 |
| 4,236,867 | 12/1980 | Morris . |
| 4,321,009 | 3/1982 | Fujii et al. . |
| 4,780,051 | 10/1988 | Fisher, Jr. ................................. 415/116 |
| 5,322,412 | 6/1994 | Erlich .......................................... 415/1 |
| 5,823,740 | 10/1998 | Cybularz et al. ........................ 415/115 |

FOREIGN PATENT DOCUMENTS 0 715 076 A1  5/1996  European Pat. Off. .

OTHER PUBLICATIONS

Hydro Review, Feb. 1993; "A Primer on Draft Tube Surging" by Falvey.

*Primary Examiner*—John Kwon
*Attorney, Agent, or Firm*—Foley & Lardner

[57] ABSTRACT

A turbine installation for regulating the levels of dissolved gas such as oxygen in water flowing therethrough. The turbine installation comprises a runner rotatably mounted within a stationary casing. The runner includes a crown, a band, and a plurality of blades extending between the crown and the band. The stationary casing includes a head cover disposed concentric with and spaced from the crown and a discharge ring concentric with and spaced from the band. At least one annular seal is disposed between the casing the runner to limit water leakage into a mixing chamber formed between the relatively rotating casing and runner. A gas supply is in fluid communication with the mixing chamber for supplying a flow of a gas thereto, and a control system controls the flow of gas into the mixing chamber for regulating the level of dissolved gas in the water discharged from the turbine installation.

20 Claims, 13 Drawing Sheets

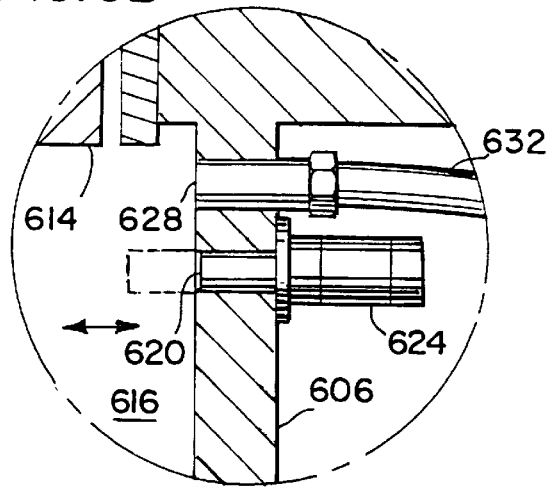
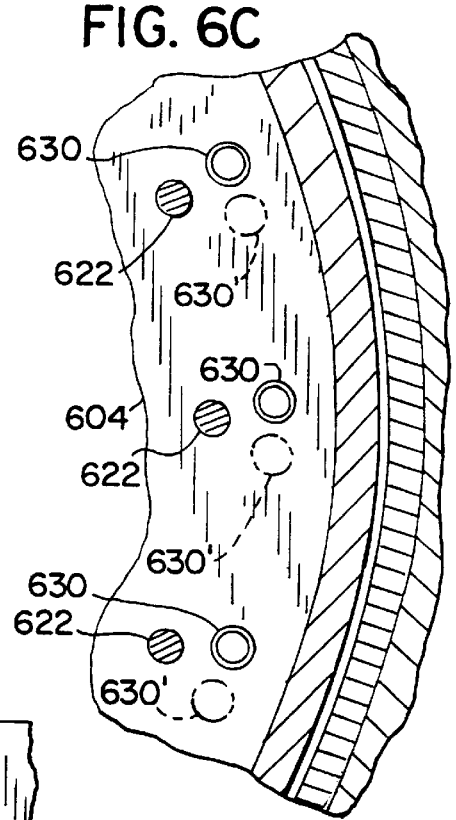
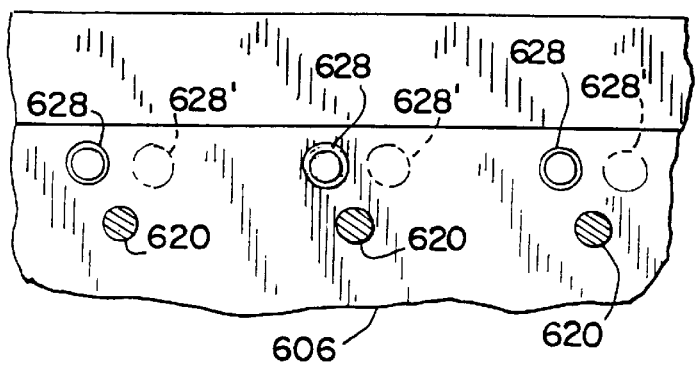
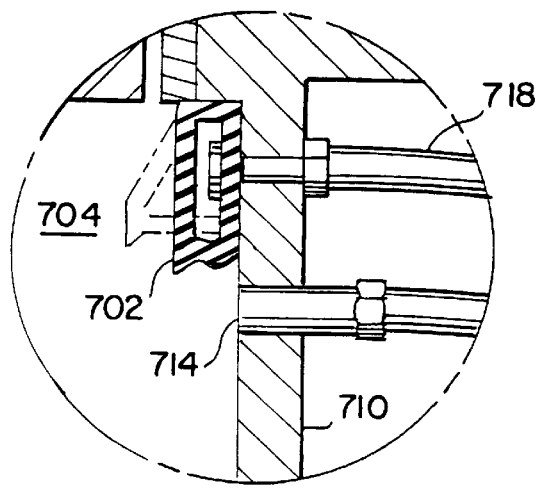

DISSOLVED GAS AUGMENTATION WITH MIXING CHAMBERS

RELATED APPLICATIONS

This application is a divisional of U.S. Ser. No. 08/805,286, filed Feb. 25, 1997, which is now U.S. Pat. No. 5,823,740, issued Oct. 20, 1998.

FIELD OF THE INVENTION

The present invention relates generally to hydroelectric turbine installations. More particularly, this invention pertains to hydroelectric installations with means for enhancing the level of dissolved gas in water passing through the turbine.

BACKGROUND OF THE INVENTION

A significant environmental problem for many hydroelectric facilities is the water quality of turbine discharges. The primary water quality problem is often low dissolved oxygen (DO) levels which occur seasonally. During the summer months, thermal stratification of the reservoir produces a surface layer of less dense, warm water with relatively high dissolved oxygen and a lower, relatively cold oxygen-depleted layer resulting from the decay of organic material on the reservoir bottom. Because hydraulic turbines draw their discharges from the lower level, this can create water quality problems downstream of the facility.

Relicensing and rehabilitation of a hydroelectric facility offer an opportunity to address environmental and industrial development concerns over dissolved oxygen levels and other water quality regulations which affect hydropower releases. Rehabilitating an existing hydroelectric facility may, as explained in co-pending U.S. patent application Ser. No. 08/733,366 filed Oct. 17, 1996 to the same assignee, include replacement of the runner. Replacing an existing runner with a new runner having integral passages, and providing air through the integral passages, can be used to enhance dissolved oxygen levels in the water without disturbing the existing foundation of the facility.

To improve water quality in prior art turbine installations having shrouded runners, it is known to supply air through the foundation to the shroud spaces adjacent the runner crown and band. In particular, it is known to admit air through the discharge ring to the annular chamber between the band and the discharge ring. It is also known to supply air through the head cover to the annular chamber between the crown and the head cover.

Providing air admission to these annular chambers has heretofore been done, however, for two reasons. First, the aeration of these chambers has been used to quiet pressure pulsations being caused by part load or overload vortices within the draft tube. Second, the aeration has been used to expel water from these chambers, while maintaining the air within the chambers, to reduce the disc friction losses and thereby increase operating efficiency of the turbine. In other words, in this second case the aeration devices are designed to separate the gas from the water rather than to have the gas entrained by the water as the water exits the chambers. Accordingly, it appears desirable to develop new ways to improve the water quality of hydropower releases, and thereby increase the survivability of fish downstream of such turbine installations.

SUMMARY OF THE INVENTION

A turbine installation is configured to regulate a level of dissolved oxygen in water passing through the turbine. The installation comprises a control system and a stationary casing for containing turbine components including a rotably mounted runner. The casing extends from an upstream inlet port to a downstream outlet port. The casing includes a head cover, a discharge ring and a draft tube. The runner is disposed in the casing so that water flowing therethrough impinges on the runner and causes the runner to rotate. The runner includes a crown, a band substantially concentric with the crown, and a plurality of blades extending between the crown and the band at spaced intervals along the crown. A first annular seal is disposed between the runner and the casing to limit water leakage into a first mixing chamber formed between the runner and the casing. A gas supply is in fluid communication with the first mixing chamber for supplying an oxygen containing gas thereto. The control system controls a flow of oxygen containing gas from the gas supply to the first mixing chamber and regulates the level of dissolved oxygen in the water being discharged from the downstream port.

Other advantages of the invention will become apparent from the detailed description given hereinafter. It should be understood, however, that the detailed description and specific embodiments are given by way of illustration only since, from this detailed description, various changes and modifications within the spirit and scope of the invention will become apparent to those skilled in the art.

BRIEF DESCRIPTION OF THE DRAWINGS

The preferred exemplary embodiment of the invention will hereinafter be described in conjunction with the appended drawings, wherein like numerals denote like elements and:

FIG. 6B is an enlarged cross-sectional view of the band seal area and mixing vane of FIG. 6A showing the portion thereof bounded by line 6B—6B shown in FIG. 6A;

FIG. 6C is an enlarged partial sectional view of the crown seal area and mixing vanes of FIG. 6A taken along the line 6C—6C shown in FIG. 6A;

FIG. 6D is an enlarged view of the band seal area and mixing vane of FIG. 6A taken along the line 6D—6D shown in FIG. 6A;

FIG. 7B is an enlarged cross-sectional view of the band seal area and inflatable baffle of FIG. 7A showing the portion thereof bounded by line 7B—7B shown in FIG. 7A;

DETAILED DESCRIPTION OF A PREFERRED EXEMPLARY EMBODIMENT

The present invention relates generally to hydroelectric installations having turbines provided with features designed to enhance the level of a dissolved gas, such as oxygen, in water flowing through the turbines.

Figure 1A:
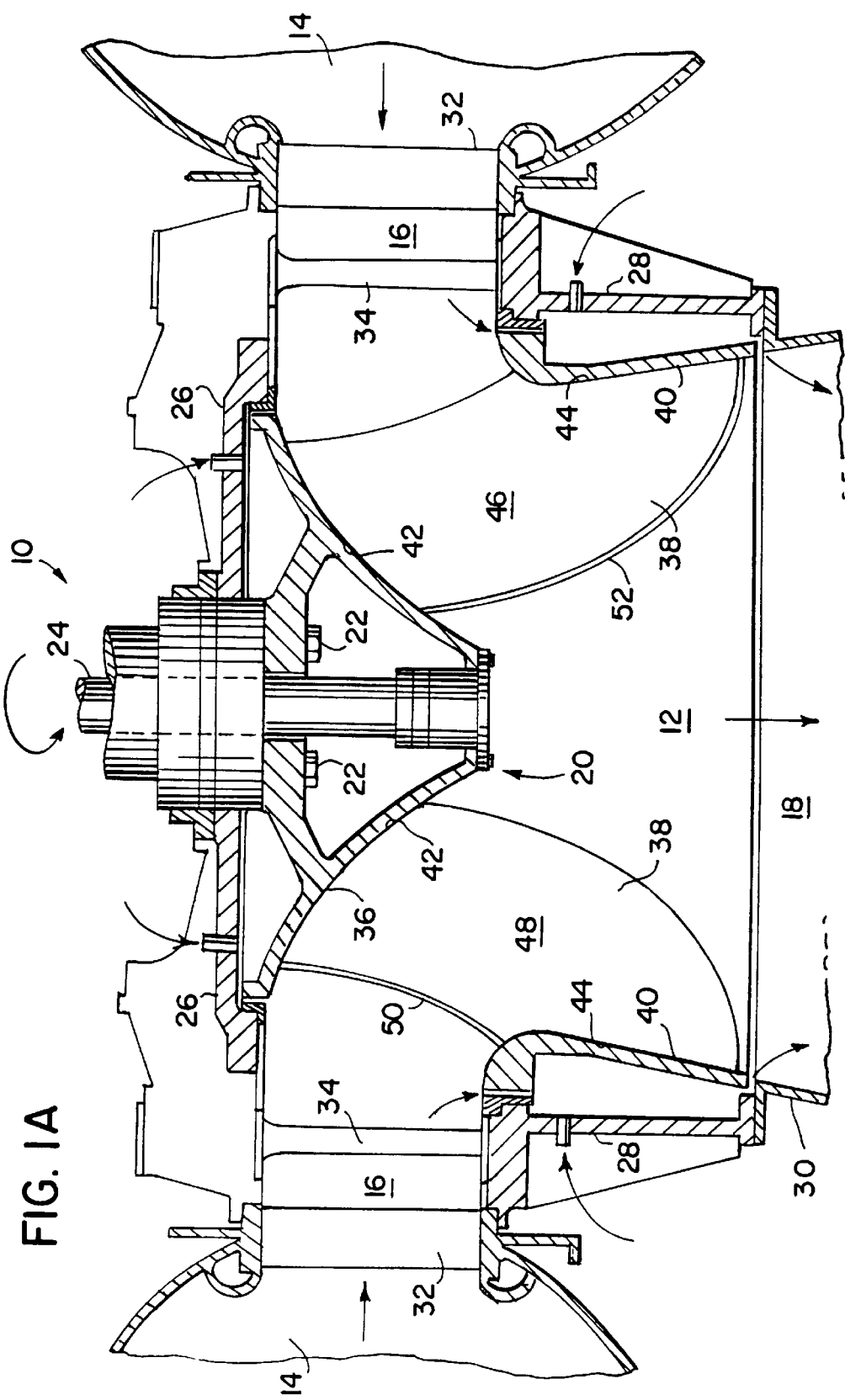
FIG. 1A is an elevational view, partially in cross-section, of a Francis turbine including a rotatably mounted runner and gas admission passages leading to mixing chambers adjacent the runner crown and runner band.

Referring to FIG. 1A, a portion of a hydroelectric turbine installation generally designated as 10 comprises a passageway 12, in which water flows from a source 14 in fluid communication with an upstream inlet port 16, to a lower elevation downstream outlet port 18. As illustrated, installation 10 is a Francis turbine having a runner 20 secured by bolts 22 to a shaft 24 supported for rotation therewith, a head cover 26, a bottom discharge ring 28 and a draft tube 30. Head cover 26, discharge ring 28 and draft tube 30 are stationary components which together form a housing or casing through which the water flows. Installation 10 also includes a plurality of stay vanes 32 connecting head cover 26 to discharge ring 28 and a plurality of pivotally adjustable wicket gates 34 for regulating the flow of water impinging on runner 20.

Turbine runner 20 includes a crown 36 and a plurality of circumferentially spaced runner blades 38 extending from crown 36 and terminating at an enclosing band 40 substantially concentric with crown 36. Each blade 38 is fixedly secured to crown 36 along an inner edge 42 of blade 38, and to band 40 along a distal outer edge 44. Each blade 38 has a water directing surface defined by a pressure side 46, an oppositely facing suction side 48, a leading edge 50 and a spaced apart trailing edge 52.

Figure 1B:
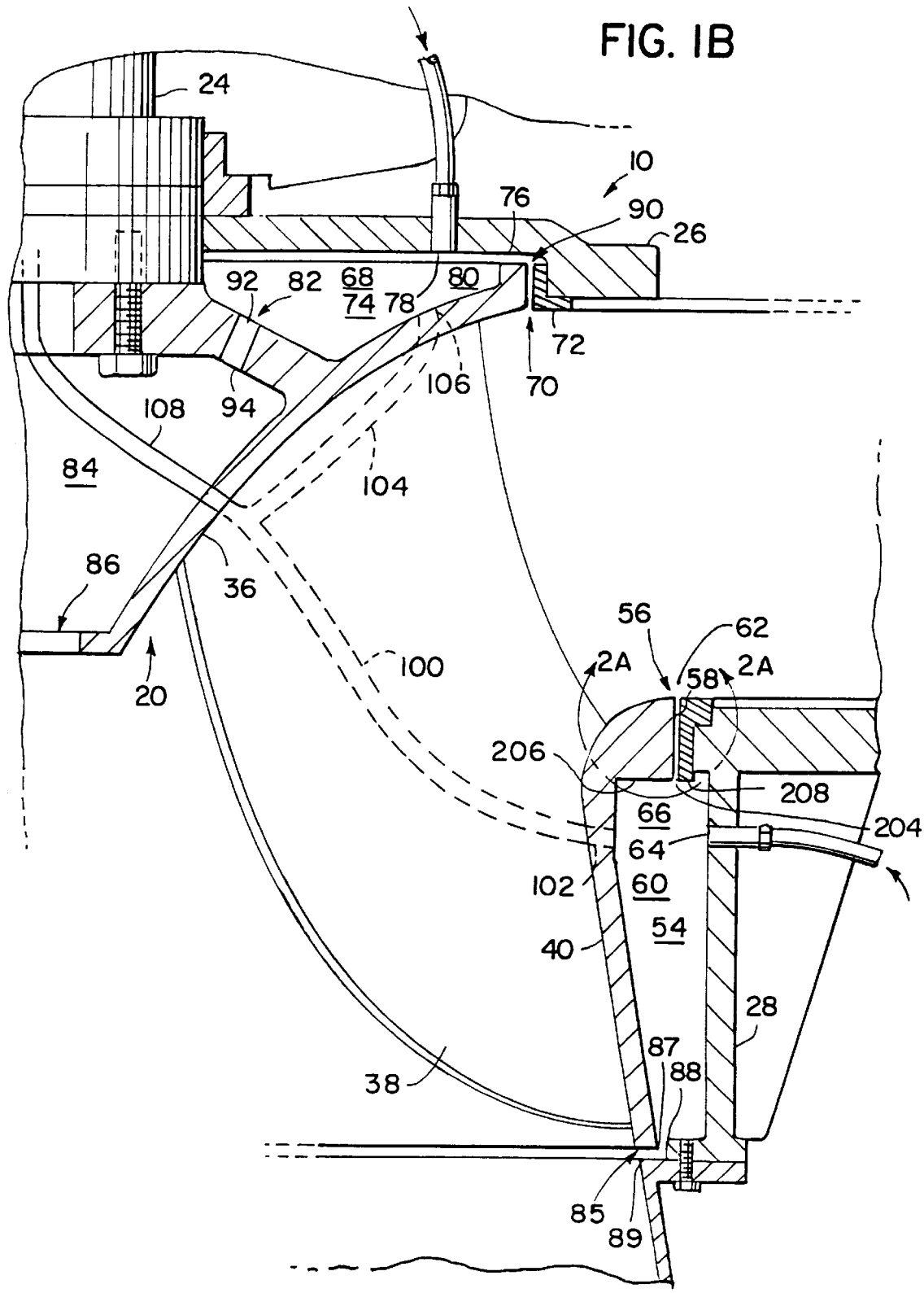
FIG. 1B is an enlarged elevational view, partially in cross-section, showing one side of the Francis turbine of FIG. 1A.

Referring now to FIG. 1B, stationary discharge ring 28 is substantially concentric with band 40 and spaced outwardly therefrom to form an annular gap 54 therebetween permitting relative rotation of band 40 and ring 28. An annular band seal 56 is disposed between discharge ring 28 and an outwardly facing surface 58 of band 40 to limit water leakage into annular gap 54, thus forming a band mixing chamber 60. Preferably, band seal 56 is adjacent an upstream end 62 of annular gap 54 so that the length of the water flow path through band mixing chamber 60 is maximized. The average flow of water through chamber 60 (meaning the overall water flow through chamber 60 rather than the local water flow at a particular location within chamber 60) is down and in the direction of runner rotation.

At least one gas admission aperture 64 is provided in discharge ring 28 to allow a gas to be injected into band mixing chamber 60, and preferably two gas admission apertures 64 are provided at about 180° apart. The gas injected into mixing chamber 60 may be an oxygen containing gas such as air. Gas apertures 64 are located at an upstream end 66 of mixing chamber 60, and preferably just downstream of band seal 56. Accordingly, the location of gas aperture 64 relative to upstream end 66 allows water flowing past aperture 64 to entrain gas being exhausted therefrom. As a result, residency time of gas bubbles within mixing chamber 60 is maximized due to the long length of the water flow path extending therethrough.

Stationary head cover 26 is substantially concentric with crown 36 and spaced therefrom to form an annular gap 68 therebetween permitting relative rotation of crown 36 and head cover 26. An annular crown seal 70 is disposed between head cover 26 and an outwardly facing surface 72 of crown 36 to limit water leakage into annular gap 68, thus forming a crown mixing chamber 74. Preferably, crown seal 70 is adjacent an upstream end 76 of annular gap 68 (which is at the outer diameter of annular gap 68) so that the length of the water flow path through crown mixing chamber 74 is maximized. The average (or overall) flow of water through chamber 74 is generally inward and in the direction of runner rotation (i.e., spirally inwardly). At least one gas admission aperture 78 is provided in head cover 26 to allow a gas to be injected into crown mixing chamber 74, and preferably two gas admission apertures 78 are provided at about 180° apart. The gas injected into mixing chamber 74 may be an oxygen containing gas such as air. Apertures 78 are located at an upstream end 80 of mixing chamber 74, and preferably just radially inward of crown seal 70. Accordingly, the location of gas aperture 78 relative to upstream end 76 allows water flowing past aperture 78 to entrain gas being exhausted therefrom. As a result, the residency time of gas bubbles within mixing chamber 74 is maximized. The gas and water mixture exits from crown mixing chamber 74 through a plurality of inwardly and downwardly slanted exhaust passages 82 leading to a central hollow hub 84 and, from there, downwardly through a central aperture 86 to rejoin the primary water flow passing through runner 20. Passages 82 preferably extend in the direction of runner rotation to assist exhaust therethrough, that is, an upstream end 92 of each passage 82 preferably leads a downstream end 94 thereof in rotation.

During operation of turbine 10, a cloud of gas bubbles forms in mixing chambers 60 and 74, which is continuously stirred by the rotation of runner 20 within the casing. More specifically, stirring takes place by natural fluid motion arising as a consequence of the formation of Taylor vortices between the two concentric, relatively rotating cylinders of band 40 and discharge ring 28, and the formation of fluid shear forces between the relatively rotating crown 36 and head cover 26. The formation of Taylor vortices is facilitated by the configurations of chambers 60 and 74, particularly the dimensionally controlled gap (or distance) between band 40 and discharge ring 28 and the gap between crown 36 and head cover 26. Additional fluid shear occurs as the gas and water mixture exits from band mixing chamber 60 at an exhaust port 85 and rejoins the primary water flow through runner 20. Exhaust port 85 is defined by three edges 87, 88, and 89 which are preferably rounded to facilitate passage of water and gas therethrough.

In certain applications, it may be advantageous to inject a gas into mixing chambers 60 and 74 from the rotating components (such as runner 20), in addition to or instead of injecting the gas through the non-rotating components (as described above). This may depend on a number of factors such as the availability of already existing passages in the foundation or drive components, and the condition of the foundation (which sometimes is best left undisturbed). As noted earlier, runners with integrally formed gas passages, and methods of making such runners, are further described in commonly assigned co-pending U.S. patent application Ser. No. 08/733,366, the entire disclosure of which is incorporated herein by reference. In that manner, runner 20 may be provided with a gas passage 100 integrally formed therein extending from central hub 84 through blade 38 to a gas admission aperture 102 in band 40. Similarly, runner 20 may include a gas passage 104 integrally formed therein extending from hub 84 through blade 38 to a gas admission aperture 106 in crown 36. Of course, suitable plumbing (shown schematically as a conduit 108) may be provided as needed to fluidly couple gas passages 100, 104 to an external gas source (not shown).

Figure 2A:
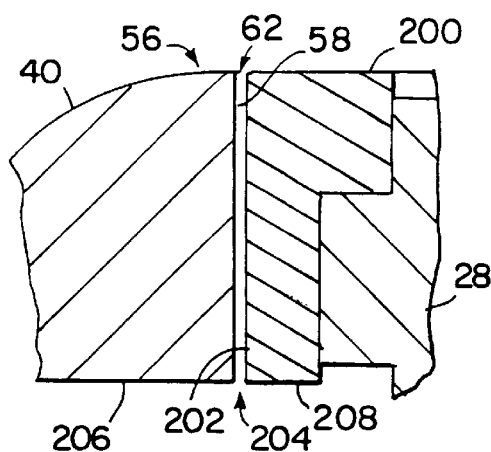
FIGS. 2A–2D are enlarged cross-sectional views of several configurations of the band seal of FIG. 1B showing the portion thereof bounded by line 2A—2A shown in FIG. 1B.
Figure 2B:
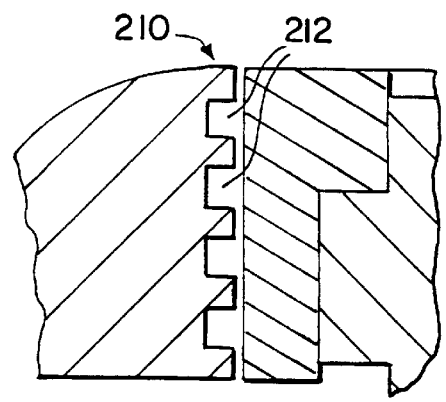
Figure 2C:
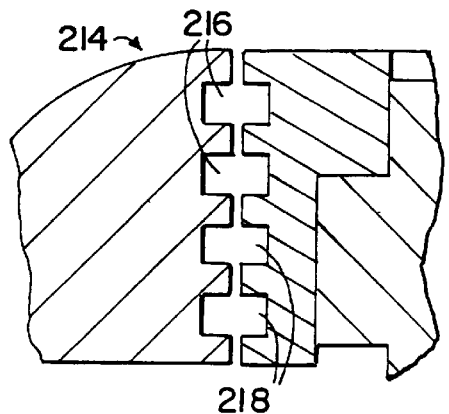
Figure 2D:
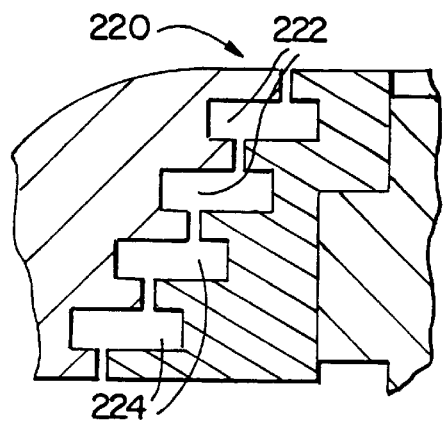

Turning now to FIG. 2A, band seal 56 comprises an annular seal ring 200 in an opposing relationship with outwardly facing surface 58 of band 40. Seal ring 200 is made of a material having a different hardness than band 40 to prevent galling, and thus preclude damage which might otherwise result if contact should occur therebetween during operation. Seal ring 200 is secured to discharge ring 28 by a suitable means, such as thermal force fitting or bolts. Although seal ring 200 is illustrated secured to discharge ring 28, an alternative or additional seal ring could of course be secured to band 40. Outwardly facing surface 58 of band 40 is parallel to and closely spaced from an inwardly facing cylindrical surface 202 of seal ring 200. Band seal 56 includes an abrupt transition 204 (the importance of which will be described below) leading into mixing chamber 60 formed by horizontal steps 206, 208 which extend from respective vertical seal surfaces 58, 202. As shown in FIG. 1B, crown seal 70 includes a similarly abrupt transition 90 leading into crown mixing chamber 74. In the embodiment of FIG. 2A, seal surfaces 58 and 202 are cylindrical planar surfaces, but more complex seal surface configurations such as labyrinth seals could of course be employed. For example, FIG. 2B shows a band seal 210 employing single-sided grooves 212, FIG. 2C shows a band seal 214 employing double-sided grooves 216 and 218, and FIG. 2D shows a band seal 220 employing double-sided, staggered grooves 222 and 224. A common feature of these seal configurations is that they each allow the runner to be adjusted vertically relative to the discharge ring, which is necessary for bolting runner 20 to shaft 24 during installation.

Figure 3A:
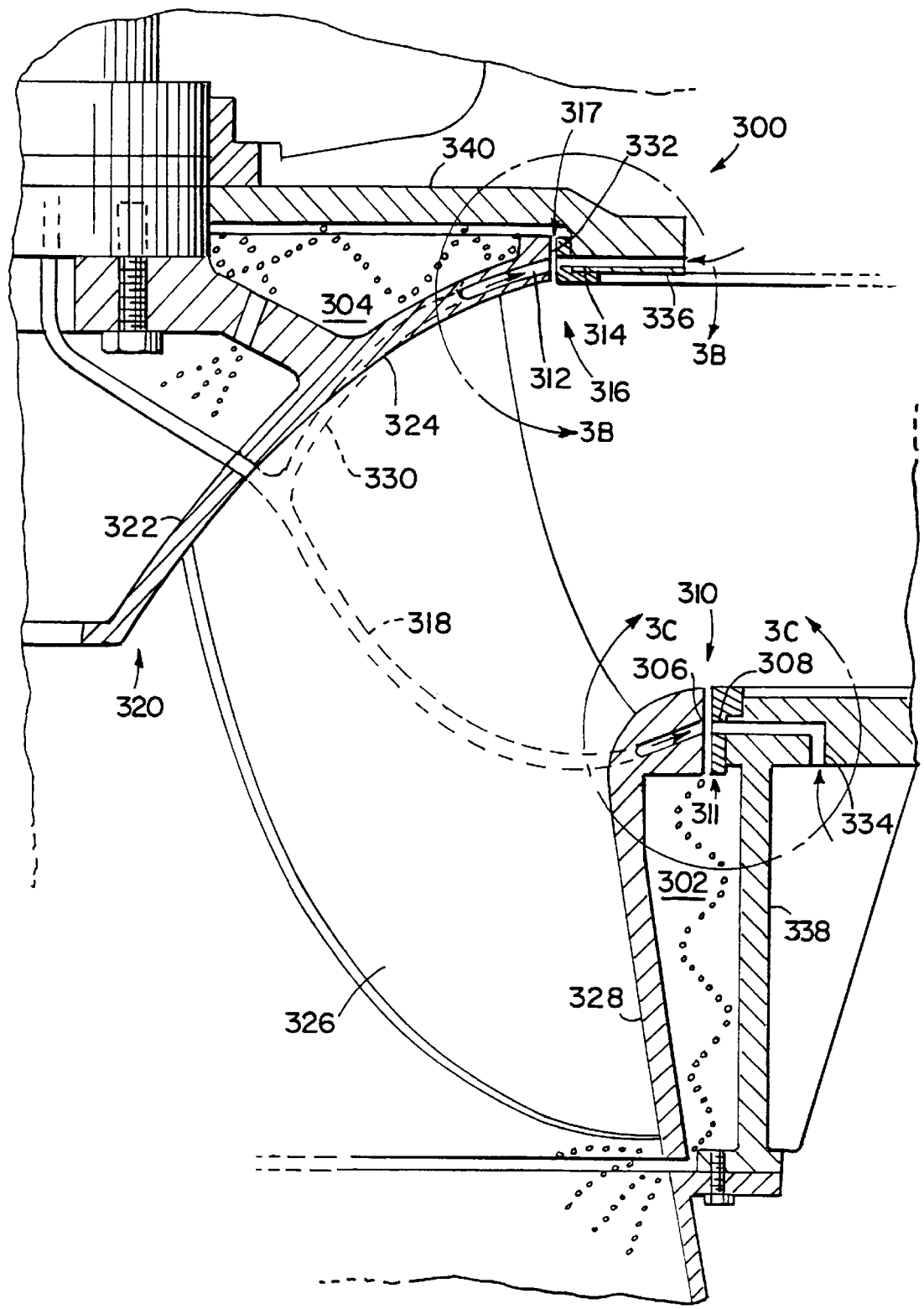
FIG. 3A is an elevational view, partially in cross-section, of a Francis turbine in which a gas is supplied through gas admission passages to the band seal area and the crown seal area.
Figure 3B:
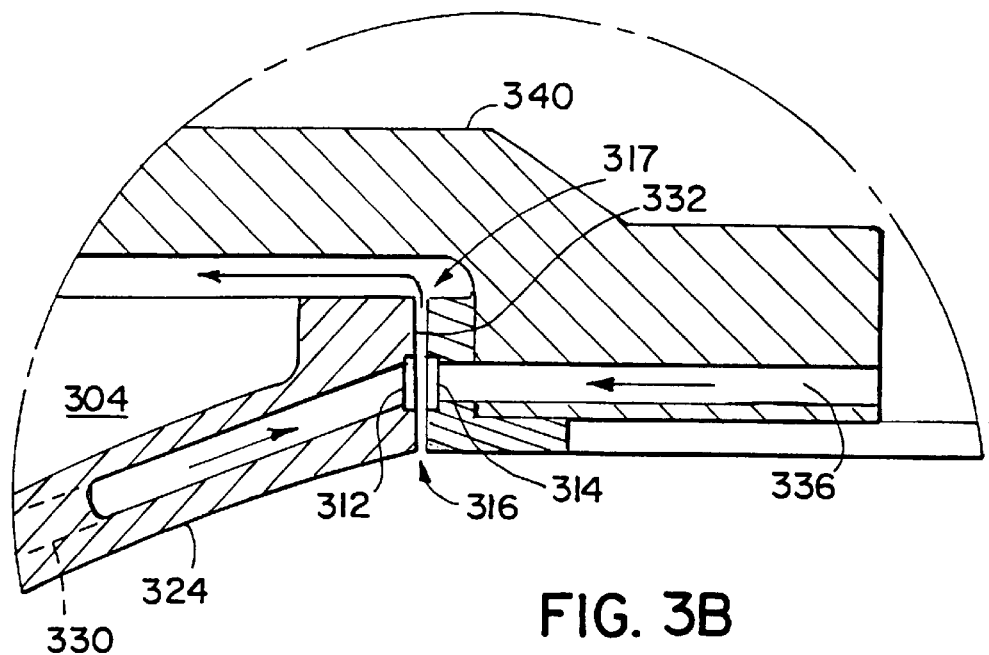
FIG. 3B is an enlarged cross-sectional view of the crown seal of FIG. 3A showing the portion thereof bounded by line 3B—3B shown in FIG. 3A.
Figure 3C:
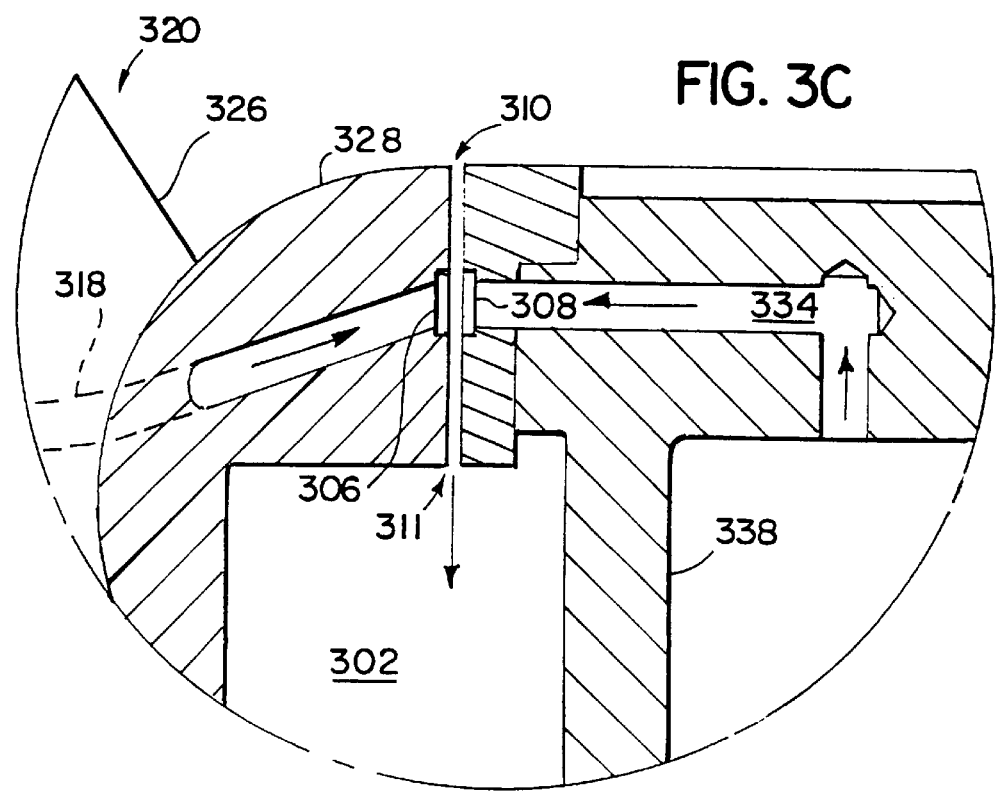
FIG. 3C is an enlarged cross-sectional view of the band seal area of FIG. 3A showing the portion thereof bounded by line 3C—3C shown in FIG. 3A.

Referring now to FIGS. 3A–3C, another embodiment of a shrouded turbine 300 provided with a band mixing chamber 302 and a crown mixing chamber 304 will be described. The description of turbine 300, however, will be generally limited to aspects thereof which differ from turbine 10 as described above (and illustrated in FIGS. 1A, 1B and 2A), with the remaining aspects otherwise being substantially the same. Gas is supplied to band mixing chamber 302 by injection through a gas admission aperture 306 and/or 308 located within a band seal 310 upstream of chamber 302, rather than by injection directly into chamber 302. Similarly, gas is supplied to crown mixing chamber 304 by injection through a gas admission aperture 312 and/or 314 located within a crown seal 316 upstream of chamber 304. With this arrangement, band seal 310 and crown seal 316 effectively form pre-mixing chambers that create an ideal environment for mixing the gas and water in a way that develops a high concentration of small gas bubbles. More specifically, as the gas and water mixture jets out of seals 310 and 316, the sudden expansion into mixing chambers 302 and 304, respectively, resulting from abrupt transitions 311 and 317 creates fluid shear and turbulence further developing a fine bubble mixture.

Gas admission aperture 306 is in fluid communication with a gas passage 318 integrally formed in a runner 320 extending from a central hollow hub 322 of a crown 324, through a runner blade 326, to an enclosing band 328. Similarly, gas admission aperture 312 is in fluid communication with a gas passage 330 integrally formed in runner 320 extending from central hub 322 through blade 326 to an outwardly facing edge 332 of crown 324. Alternative or additional gas admission apertures 308 and 314 are fluidly coupled to respective gas passages 334 and 336 which extend through a discharge ring 338 and a head cover 340, respectively. Of course, suitable plumbing may be provided as needed for fluidly coupling central hub 322 and/or gas passage 334 and 336 to an external gas source (not shown). Alternatively, a blower or compressor (such as shown schematically in FIG. 8) may be employed to assist gas flow to the seal areas.

Figure 4A:
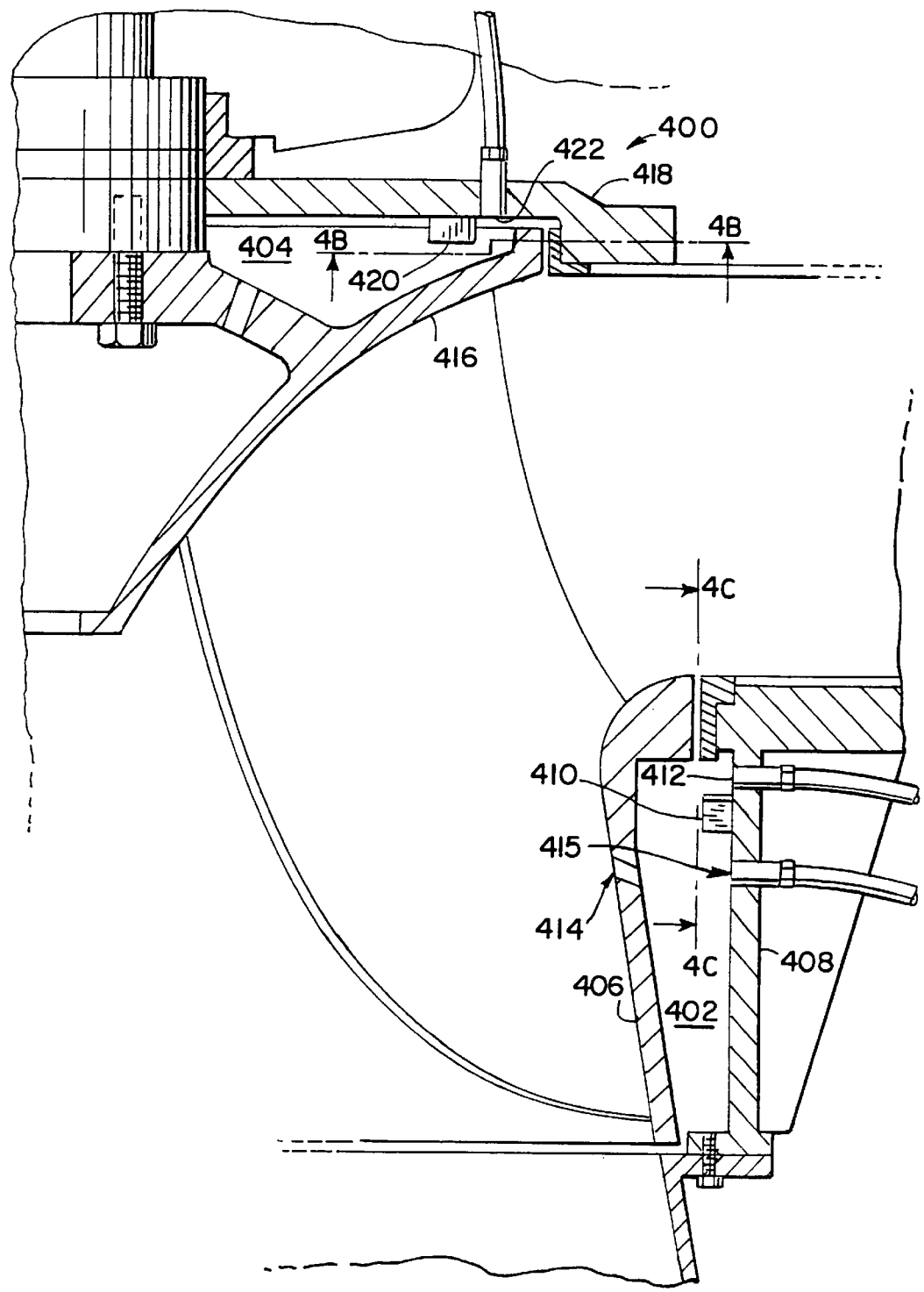
FIG. 4A is an elevational view, partially in cross-section, of a Francis turbine with mixing vanes extending into the mixing chambers to promote mixing of an oxygen containing gas and water leaking into the chambers.
Figure 4C:
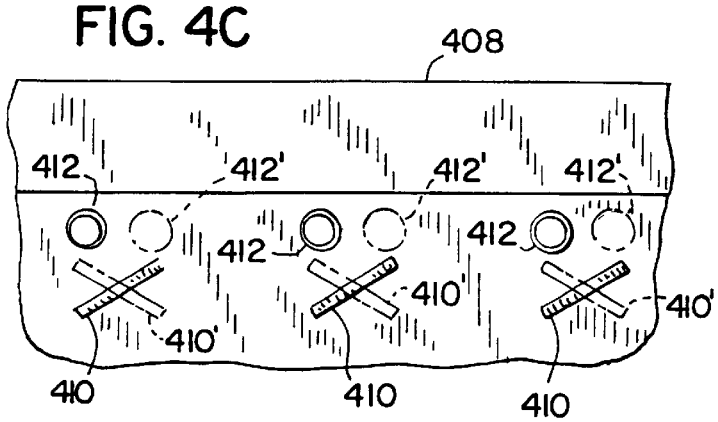
FIG. 4C is an enlarged view of the band seal area and mixing vane of FIG. 4A taken along the line 4C—4C shown in FIG. 4A.
Figure 4B:
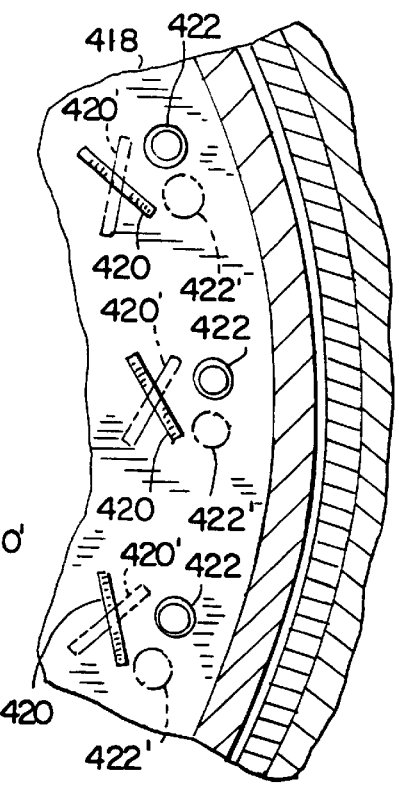
FIG. 4B is an enlarged partial sectional view of the crown seal area and mixing vanes of FIG. 4A taken along the line 4B—4B shown in FIG. 4A.

Turning now to FIGS. 4A–4C, another embodiment of a shrouded turbine 400 with a band mixing chamber 402 and a crown mixing chamber 404 will be described. Again, the description of turbine 400 will be generally limited to aspects thereof which differ from turbine 10 as described above (and illustrated in FIGS. 1A, 1B and 2A), with the remaining aspects otherwise being substantially the same.

Band mixing chamber 402, which is formed between a rotating band 406 and a stationary discharge ring 408, is provided with mixing vanes 410 to further promote effective mixing in chamber 402. Although mixing vanes 410 are illustrated secured to discharge ring 408, alternative or additional mixing vanes could of course be secured to band 406. Water flowing past gas admission apertures 412 entrains gas being exhausted therefrom and at some point flows around and past mixing vanes 410. Mixing vanes 410 cause additional fluid shear and turbulence in the water/gas mixture, thereby promoting the dispersion of gas bubbles throughout the chamber. Alternative mixing vanes 410' and gas admission apertures 412' are shown in phantom lines to illustrate corresponding vane/aperture positions in the event the runner rotation is in the opposite direction. However, it should be made clear that the vane/aperture positions in the Figures are illustrative only, and that the relative positions thereof are particularly suitable to rearrangement, for example, vanes 410, 410' could be located above (or upstream) of respective apertures 412, 412' instead of below (or downstream).

Figure 6A:
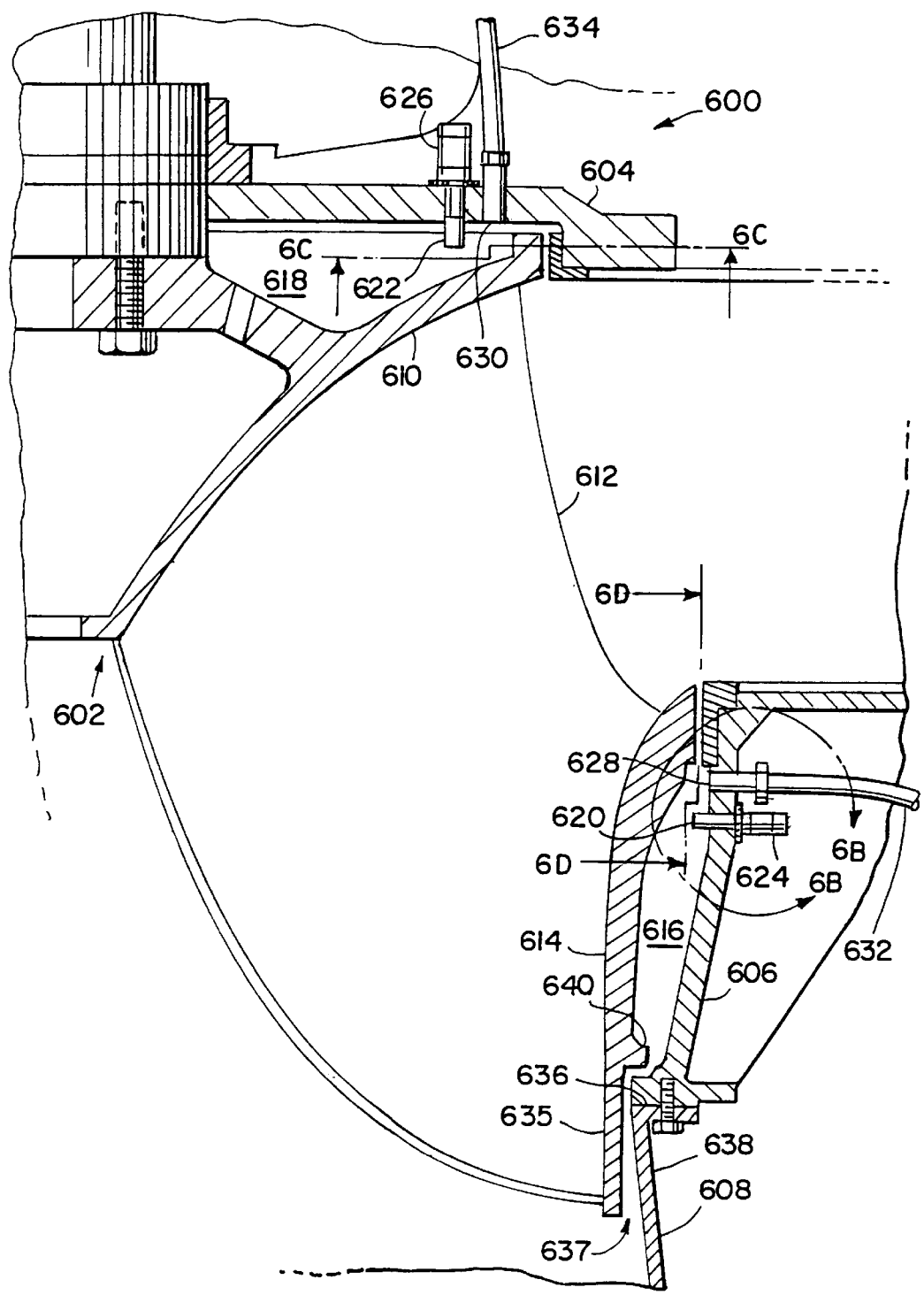
FIG. 6A is a view of a Francis turbine similar to that shown in FIG. 4A, but with retractable mixing vanes and the band overhanging a portion of the discharge ring.

Band mixing chamber 402 may be provided with water inlet passages 414 and/or 415 to allow the flow of water through chamber 402 to be increased, thereby reducing the possibility of saturating the water with gas, while also allowing the extraction of energy from the water before entering mixing chamber 402. Water inlet passages 414 may extend through band 406 to allow additional water from the primary water flow to join the leakage water flow already in chamber 402. Passages 414 preferably extend downwardly and in an opposite direction of runner rotation (taken from a perspective at the rotational axis of the runner outwardly) to assist the flow of water therethrough into chamber 402. Water inlet passages 415 may extend through discharge ring 408 to bring additional water to chamber 402 from a more remote source such as a tail race, tailwater pond or headwater pond. Preferably, water inlet passages 415 extend to whatever convenient source of nearby water has the lowest energy level (meaning mostly potential energy but also kinetic energy) while also having a water pressure greater than that in chamber 402. Particularly suitable to such an arrangement is an overhung band configuration (described in detail below with reference to FIG. 6A) because of the further reduction of water pressure in the mixing chamber caused by the overhang.

Crown mixing chamber 404, which is formed between a rotating crown 416 and a stationary head cover 418, is provided with mixing vanes 420 to further promote effective mixing in chamber 404. Although mixing vanes 410 are preferably secured to head cover 418, alternative or additional mixing vanes could of course be secured to crown 416. Thus, the water flows past gas admission apertures 422 to entrain gas being exhausted therefrom, and at some point flows around and past the mixing vanes 420. Mixing vanes 420 cause additional fluid shear and turbulence in the water/gas mixture, thereby promoting the dispersion of gas bubbles throughout the chamber. Alternative mixing vanes 420' and gas admission apertures 422' are shown in phantom to illustrate corresponding vane/aperture positions in the event the runner rotation is in the opposite direction. Again, however, the vane/aperture positions in the Figures are illustrative only and could be, for example, opposite that illustrated with the vanes generally upstream of the apertures. Additionally, crown mixing chamber 404 could of course be provided with water inlet passages similar in concept to passages 414 and/or 415 associated with band mixing chamber 402 to increase the water flow through chamber 404.

Figure 5C:
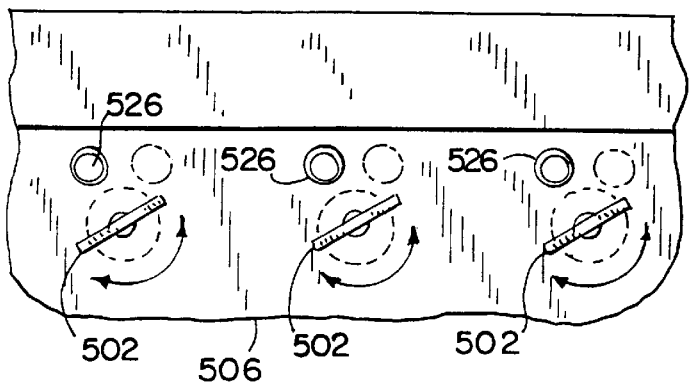
FIG. 5C is an enlarged view of the band seal area and mixing vane of FIG. 5A taken along the line 5C—5C shown in FIG. 5A.
Figure 5B:
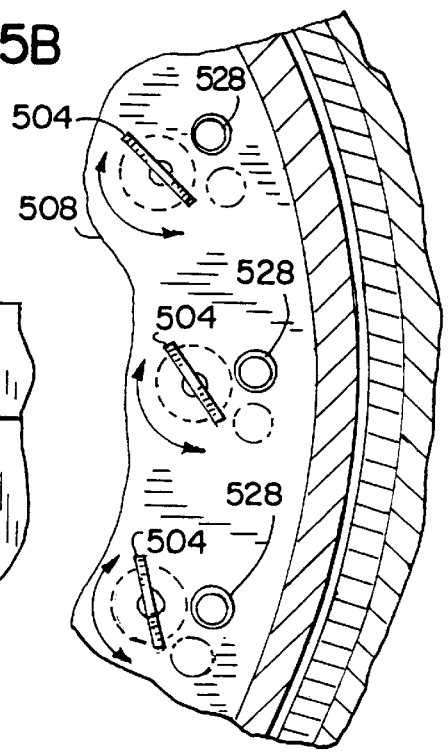
FIG. 5B is an enlarged partial sectional view of the crown seal area and mixing vanes of FIG. 5A taken along the line 5B—5B shown in FIG. 5A.
Figure 5A:
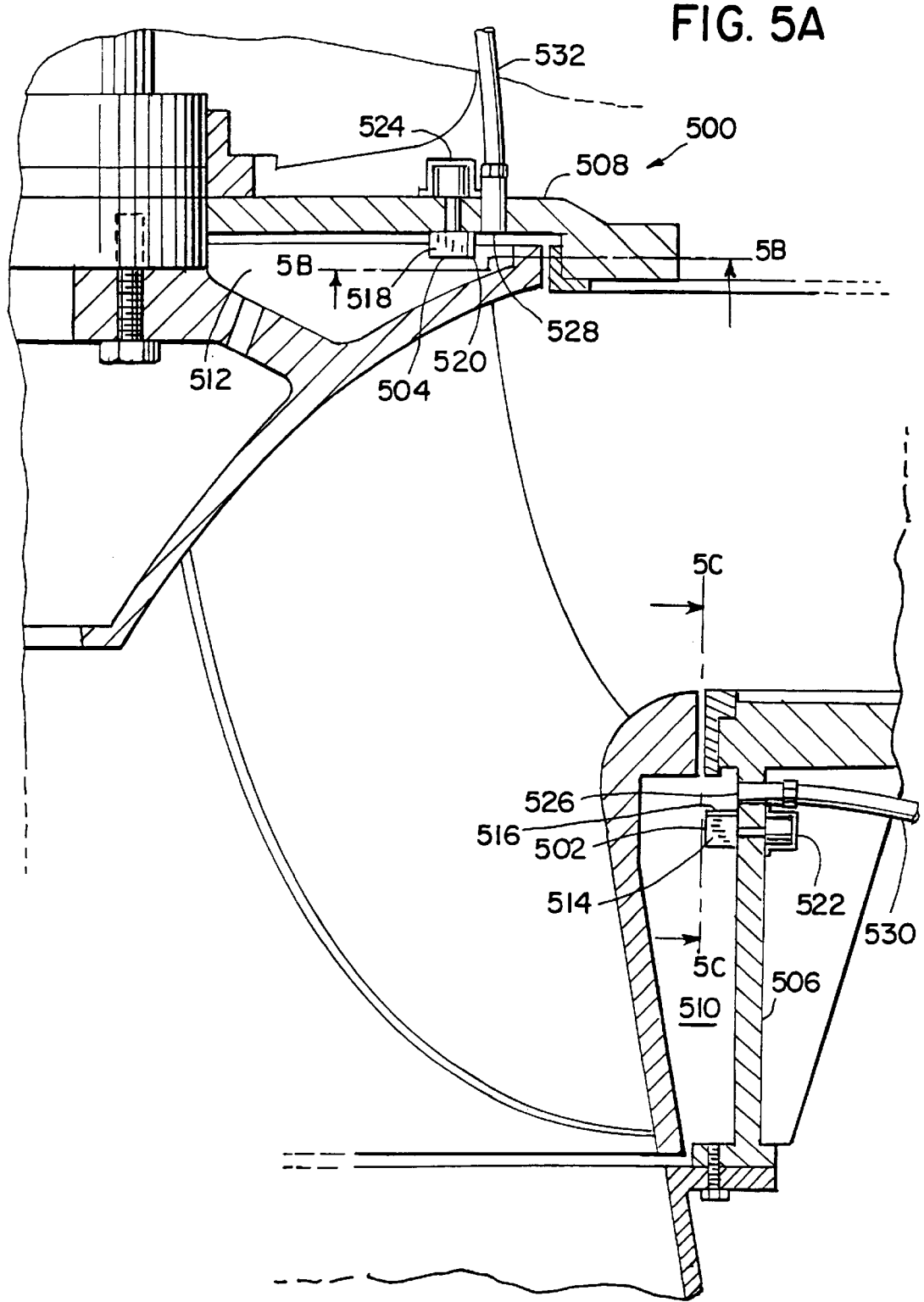
FIG. 5A is a view of a Francis turbine similar to that shown in FIG. 4A, but with rotatable mixing vanes.

Referring now to FIGS. 5A–5C, another embodiment of a shrouded turbine 500 is illustrated. Turbine 500 is similar to turbine 400 described above except that mixing vanes 502 and 504 are rotatably attached to a discharge ring 506 and a head cover 508, respectively, rather than fixedly attached. Mixing vanes 502 and 504, which extend respectively into a band mixing chamber 510 and a crown mixing chamber 512, are rotatable to minimize parasitic losses therefrom in the chambers which negatively affect turbine performance. More specifically, mixing vanes 502 are rotatable between a maximum aeration producing position (as determined by gas sensors downstream of the turbine) and a position that will result in minimized power losses (as determined by efficiency calculations based on various measured turbine operating parameters). Similarly, mixing vanes 504 are rotatable between a maximum aeration producing position and a minimum power loss position. Mixing vanes 502, 504 are mechanically coupled to associated actuators 522, 524 for driving respective mixing vanes 502, 504 between positions. Actuators 522, 524 are controlled by a suitable control system (such as described below with reference to FIG. 8) which senses when dissolved gas enhancement is needed. Gas admission apertures 526, 528 are fluidly coupled with respective gas passages 530, 532 to selectively supply gas from a gas source to respective mixing chambers 510, 512.

FIGS. 6A–6D illustrate yet another embodiment of a shrouded turbine 600 comprising a rotatably mounted runner 602 surrounded by a head cover 604, a discharge ring 606 and a draft tube 608. Turbine runner 602 includes a crown 610, a plurality of blades 612 and a band 614. In most respects, turbine 600 is similar to turbine 500 described above, including a band mixing chamber 616 and a crown mixing chamber 618 provided with movable mixing vanes 620 and 622. One difference between turbines 600 and 500, however, is that mixing vanes 620, 622 are retractable with respect to discharge ring 606 and head cover 604, respectively, rather than rotatable with respect thereto. Specifically, mixing vanes 620, 622 are movable to a maximum aeration producing position in which vanes 620, 622 extend a predetermined distance into respective mixing chambers 616, 618, and a position in which vanes 620, 622 are completely withdrawn from respective chambers 616, 618, thereby eliminating any energy losses they may have caused while in an extended position. Thus, retractable mixing vanes 620, 622 provide an advantage over rotatable mixing vanes 502, 504 of causing no additional parasitic losses in the mixing chambers when it is determined (such as by a control system with gas sensors as described below with reference to FIG. 8) that an increase of dissolved gas is no longer necessary or desirable. For example, as explained in the background discussion above, there is usually less of a need to increase the dissolved oxygen level during the winter months than the summer months.

Mixing vanes 620, 622 are mechanically coupled to associated actuators 624, 626 for retracting and extending vanes 620, 622 relative to the mixing chambers. Actuators 624, 626 are controlled by the control system sensing when dissolved gas enhancement is needed. Gas admission apertures 628, 630 are fluidly coupled with respective gas passages 632, 634 to selectively supply gas from a gas source to respective mixing chambers 616, 618. Alternative gas admission apertures 628', 630' are shown in phantom to illustrate corresponding aperture positions in the event the runner rotation is in the opposite direction. Again, however, the vane/aperture positions in the Figures are illustrative only and could be, for example, opposite that illustrated with the vanes generally upstream of the apertures.

Another difference between turbine 600 and turbine 500 is that band 614 is configured with a lower portion 635 overhanging a lower edge 636 of discharge ring 606. That is, portion 635 of band 614 extends downstream past lower edge 636 of discharge ring 606 and into an upper portion 638 of draft tube 608. This arrangement allows the water directing surface of blades 612 (and therefore the power extraction capacity of runner 602) to be increased without redesign of the casing. Additionally, however, the larger diameter of upper portion 638 of draft tube 608 facing the lower portion 635 of band 614 reduces the water pressure of the primary water flow passing through runner 602 adjacent an exhaust port 637 of mixing chamber 616, thus creating a suction effect which enhances the ability of water flowing through chamber 616 to entrain gas being exhausted from aperture 628. Furthermore, the overhung configuration causes fluid shear in the gas and water mixture upon exiting port 637 similar to that described above for the mixture exiting port 85 of turbine 10 (i.e., a normal hung band). An outwardly projecting annular ridge 640 is provided on band 614 to temporarily support runner 602 during installation thereof. The edges of ridge 640 are preferably rounded so as not to impede exhaust of the water/gas mixture.

Figure 7A:
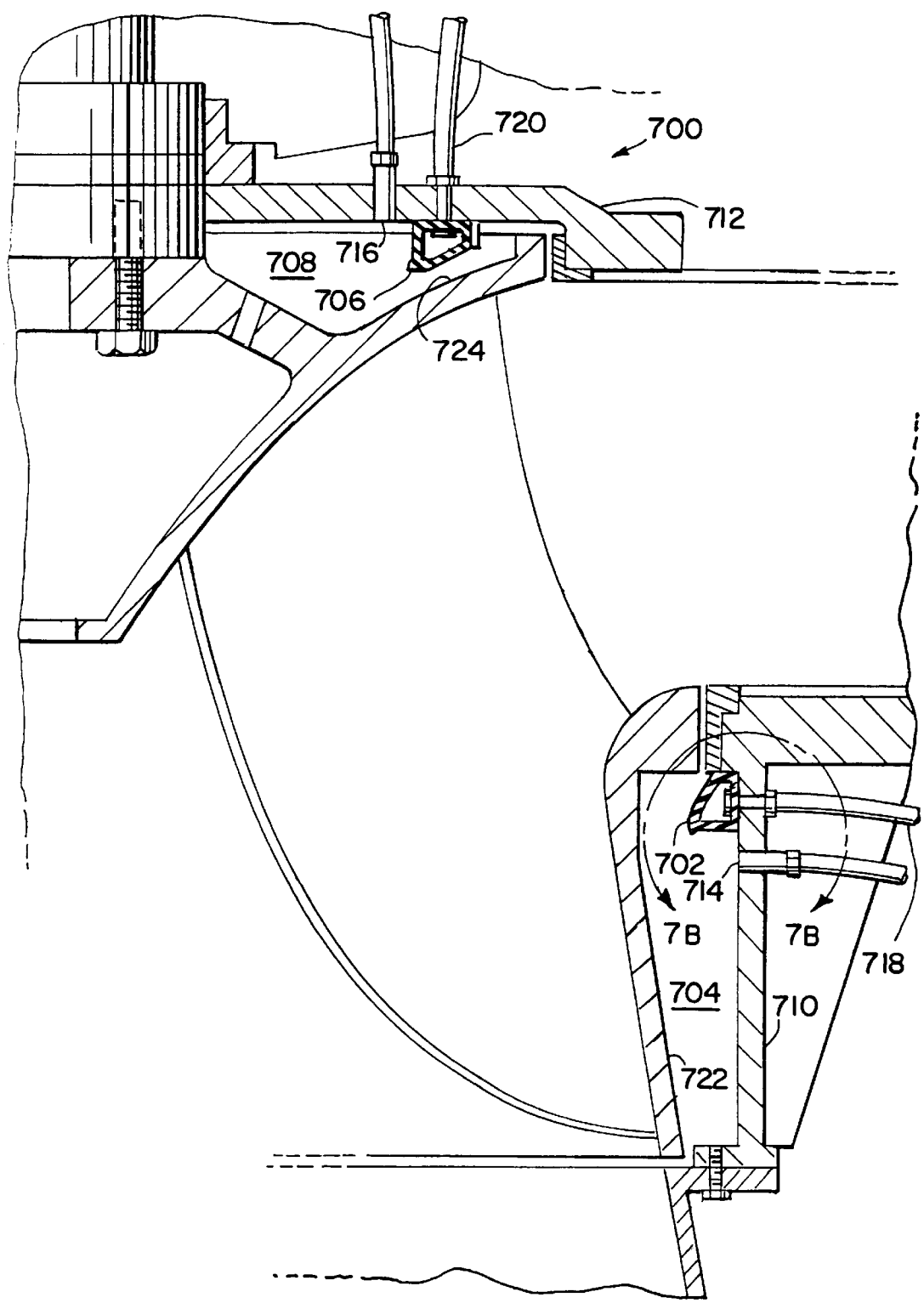
FIG. 7A is a view of a Francis turbine similar to that shown in FIG. 4A, but with an inflatable mixing baffle in place of the mixing vanes.

FIGS. 7A and 7B illustrate a shrouded turbine 700 provided with one or more inflatable baffles 702 in a band mixing chamber 704 and one or more inflatable baffles 706 in a crown mixing chamber 708. Inflatable baffle(s) 702 is (are) attached to a discharge ring 710, and inflatable baffle(s) 706 is (are) attached to a head cover 712. Of course, additional or alternative inflatable baffle(s) could be attached to the rotating components of chambers 704, 708, namely a runner band 722 and a runner crown 724. A gas admission aperture 714 is positioned generally downstream of each inflatable baffle 702, and a gas admission aperture 716 is positioned generally downstream of each inflatable baffle 706. Each baffle 702, 706 may comprise a continuous inflatable ring or belt surrounding the entire perimeter of respective mixing chambers 704, 708. Alternatively or in addition, a number of inflatable ring segments or inflatable plugs could be disposed and attached at discrete locations around the perimeter of mixing chambers 704, 708. Baffles 702, 706 may be inflated as required depending on the level of dissolved gas in the water passing through turbine 700. Baffles 702 and 706 are inflated to create fluid shear as the gas and water mixture flows thereover. In addition, baffles 702 and 706 offer the advantage of creating low pressure regions downstream thereof which may facilitate the exhaust of gas from respective gas admission apertures 714 and 716. A pump or compressor (such as described below with reference to FIG. 8) is used to force a fluid such as water or gas through inflation passages 718 and 720 to inflate respective baffles 702 and 706.

Figure 8:
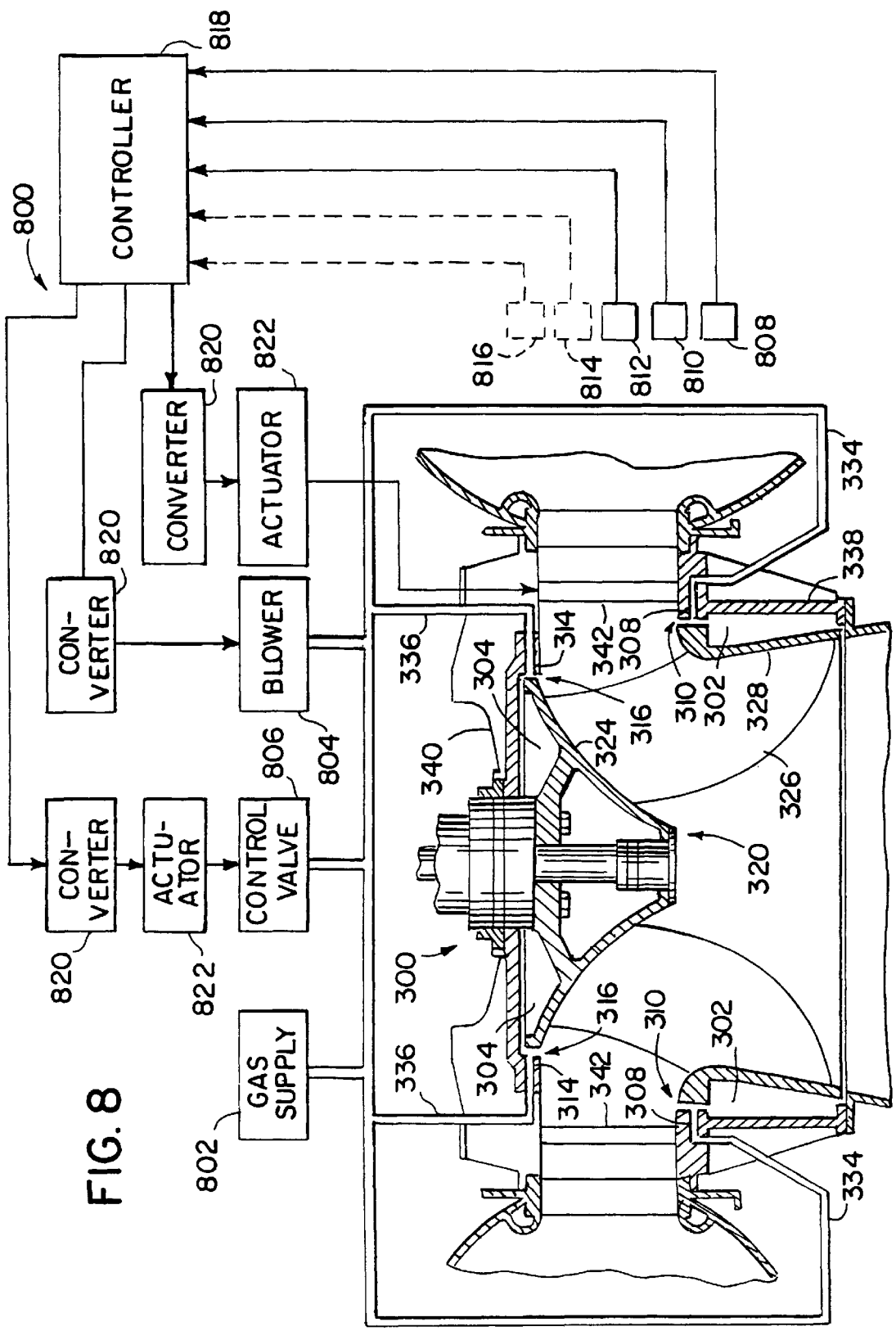
FIG. 8 shows a block diagram of a closed-loop control system associated with a turbine of the present invention.
Figure 9:
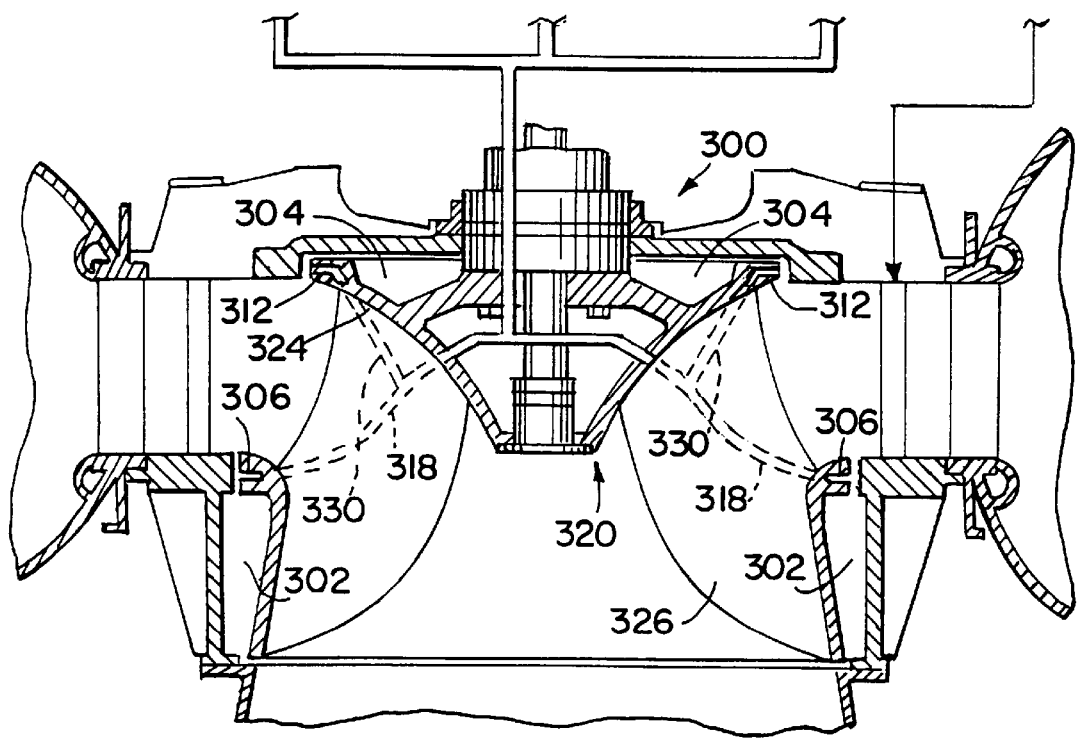
FIG. 9 shows a turbine with integral gas passages extending through the runner to the band seal area and crown seal area.

Referring now to FIG. 8, a control system designated as 800 may advantageously be used with the various embodiments of the present invention. For purposes of illustration, however, control system 800 will be shown and described in combination with turbine installation 300. Gas admission apertures 308 and 314 in discharge ring 338 and head cover 340, respectively, are connected to a gas supply 802 through respective gas supply passageways 334 and 336. Alternatively, or in addition, integral gas passages 318 and 330 may be provided in runner blades 326 for providing gas to seals 310 and 316 (see FIG. 9). In some cases, a high volume blower or compressor 804 may be provided to facilitate gas flow through gas supply passageways 334, 336, and a control valve 806 is then provided for limiting the gas flow therethrough. However, gas admission apertures 308 and 314 are preferably auto-venting so that a pump is not required, which is especially likely to be the case for the overhung configuration described above.

Control system 800 includes a plurality of sensors 808–816 designed to measure turbine speed, power output, head water elevation, tail water elevation, head losses, water temperature, and dissolved gas level (such as oxygen) in the head and tail water, among other parameters. The electric signals generated by sensors 808–816 are sent to a controller 818, preferably via signal conditioning circuits. Controller 818 may also receive an electrical signal generated by sensor 808 which is representative of the position of a wicket gate 342. Controller 818 preferably includes a digital-based processor and required analog to digital conversion and signal scaling circuits.

The information provided by the various sensors is used in control algorithms allowing controller 818 to compute and generate various control signals. The control signals in turn are used to regulate the amount of gas (such as air, or some other oxygen containing gas) flowing through passageways 334, 336, and the position of any mixing vanes to promote the mixing of the gas with the water, thereby enhancing the dissolved gas/oxygen level of water passing through turbine 300 while limiting efficiency losses. To that end, the control signals generated by controller 818 are fed to a plurality of signal converters generally designated as 820. The signal from each signal converter 820 is sent in the appropriate form to an associated actuator 822 driving control valve 806, or to blower 804.

Although a variety of embodiments have been described herein, it should be understood that the above description is of preferred exemplary embodiments of the present invention, and that the invention is not limited to the specific forms described. For example, gas supply passageway configurations and locations need not be of the kind described above. In addition, the shapes and operations of the mixing devices and their positions with respect to the gas admission apertures are particularly suitable to rearrangement. Such other constructions are, nevertheless, considered within the scope of this invention. Accordingly, these and other substitutions, modifications, changes and omissions may be made in the design and arrangement of the elements and in their method of operation as disclosed herein without departing from the scope of the appended claims.

What is claimed is:

1. A turbine installation configured to regulate a level of dissolved oxygen in water passing through the turbine, the installation comprising:

a stationary casing for containing turbine components and extending from an upstream inlet port to a downstream outlet port, the casing including a head cover, a discharge ring and a draft tube;

a runner rotatably disposed in the casing so that water flowing therethrough impinges on the runner, the runner including a crown, a band substantially concentric with the crown, and a plurality of blades extending between the crown and the band at spaced intervals along the crown;

a first annular seal disposed between the runner and the casing to limit water leakage into a first mixing chamber formed between the runner and the casing;

a gas supply in fluid communication with the first mix chamber for supplying an oxygen containing gas thereto; and a control system including a plurality of sensors for indicating a level of dissolved oxygen in the water, the control system controlling a flow of oxygen containing gas from the gas supply to the first mixing chamber and regulating the level of dissolved oxygen in the water being discharged from the downstream port.

2. The turbine installation of claim 1, wherein the first mixing chamber is located between the band and the discharge ring and is configured to promote mixing of the oxygen containing gas and water leaking into the chamber.

3. The turbine installation of claim 1, wherein the first mixing chamber is located between the crown and the head cover and is configured to promote mixing of the oxygen containing gas and water leaking into the chamber.

4. The turbine installation of claim 1, wherein the plurality of sensors selectively generate electrical signals indicative of at least the dissolved oxygen level in the water; and wherein the control system further includes an electrical controller for receiving and processing the electrical signals from the sensors, the controller capable of generating signals for adjusting in position a valve for limiting the flow of gas into the chamber.

5. The turbine installation of claim 4, wherein the control system further includes a blower or compressor for increasing the flow of gas into the chamber, and wherein the controller is capable of generating signals for adjusting the speed of the blower or compressor.

6. The turbine installation of claim 4, wherein the controller is a digital-based processor capable of generating digital control signals, and wherein the control system further includes a digital-to-analog converter for converting the digital control signals to analog control signals.

7. The turbine installation of claim 4, wherein the sensors further selectively generate signals indicative of at least one of turbine speed, power output, head water, tail water and head losses.

8. The turbine installation of claim 1, further including at least one mixing device mounted to at least one of the casing and the runner and projecting into the first mixing chamber by a predetermined distance, the mixing device being configured to promote mixing of the oxygen containing gas and water leaking into the chamber.

9. The turbine installation of claim 8, wherein the
plurality of sensors selectively generate electrical signals indicative of at least the dissolved oxygen level in the water; and wherein the control system further includes:
at least one actuator associated with the at least one mixing device; and
an electrical controller for receiving and processing the electrical signals from the sensors, the controller capable of generating signals for controlling the at least one actuator and adjusting in position the associated at least one mixing device.

10. The turbine installation of claim 9, wherein the at least one mixing device is a plurality of rotatably mounted mixing vanes, and wherein the controller is capable of generating signals for moving the mixing vanes between maximum aeration producing positions and minimum power loss positions.

11. The turbine installation of claim 9, wherein the at least one mixing device is a plurality of retractably mounted mixing vanes, and wherein the controller is capable of generating signals for moving the mixing vanes between retracted positions and extended positions.

12. The turbine installation of claim 9, wherein the at least one mixing device is an inflatable baffle, and wherein the controller is capable of generating signals for moving the baffle between an inflated position and deflated position.

13. The turbine installation of claim 1, further including a second annular seal disposed between the runner and the casing to limit water leakage into a second mixing chamber formed between the runner and the casing, wherein the gas supply is in fluid communication with the second mixing chamber for supplying an oxygen containing gas thereto, and wherein the control system controls a flow of oxygen containing gas from the gas supply to the second mixing chamber and regulates the level of dissolved oxygen in the water being discharged from the downstream port.

14. A turbine installation capable of regulating dissolved oxygen level in water passing through a casing provided with an upstream inlet port and a downstream outlet port, the installation comprising:
a rotatably mounted runner having a crown, a band substantially concentric with the crown, and a plurality of blades extending between the crown and the band at spaced intervals along the crown, each blade fixedly secured to the crown at an inner edge and to the band at a distal outer edge, each blade having a water directing surface defined by a pressure side, an oppositely facing suction side, a leading edge and a spaced apart trailing edge;
a stationary discharge ring substantially concentric with the band and spaced outwardly therefrom;
a band seal disposed between the discharge ring and the band to limit water leakage into a band mixing chamber formed therebetween;
a gas supply in fluid communication with the band mixing chamber for supplying an oxygen containing gas thereto; and
a control system including a plurality of sensor for indicating a level of dissolved oxygen in the water, the control system controlling a flow of oxygen containing gas entering the band mixing chamber and regulating the level of dissolved oxygen in the water being discharged from the downstream port.

15. The turbine installation of claim 14, wherein the
plurality of sensors selectively generate electrical signals indicative of at least the dissolved oxygen level in the water; and
wherein the control system further includes an electrical controller for receiving and processing the electrical signals from the sensors, the controller capable of generating signals for adjusting in position a valve for limiting the flow of gas into the chamber.

16. The turbine installation of claim 15, wherein the control system further includes a blower or compressor for increasing the flow of gas into the chamber, and wherein the controller is capable of generating signals for adjusting the speed of the blower or compressor.

17. The turbine installation of claim 15, wherein the sensors further selectively generate signals indicative of at least one of turbine speed, power output, head water, tail water and head losses.

18. The turbine installation of claim 14, further including at least one mixing device mounted to at least one of the band and the discharge ring and projecting into the band mixing chamber by a predetermined distance, the mixing device being configured to promote mixing of the oxygen containing gas and water leaking into the chamber.

19. The turbine installation of claim 18, wherein the
plurality of sensors selectively generate electrical signals indicative of at least the dissolved oxygen level in the water; and wherein the control system further includes:
at least one actuator associated with the at least one mixing device; and
an electrical controller for receiving and processing the electrical signals from the sensors, the controller capable of generating signals for controlling the at least one actuator and adjusting in position the associated at least one mixing device.

20. A turbine installation capable of regulating dissolved oxygen level in water passing through a casing provided with an upstream inlet port and a downstream outlet port, the installation comprising:
a rotatably mounted runner having a crown, a band substantially concentric with the crown, and a plurality of blades extending between the crown and the band at spaced intervals along the crown, each blade fixedly secured to the crown at an inner edge and to the band at a distal outer edge, each blade having a water directing surface defined by a pressure side, an oppositely facing suction side, a leading edge and a spaced apart trailing edge;
a stationary head cover disposed concentrically with the crown and spaced therefrom to permit relative rotation of the crown and head cover;
a crown seal disposed between the head cover and the crown to limit water leakage into a crown mixing chamber formed therebetween;
a gas supply in fluid communication with the crown mixing chamber for supplying an oxygen containing gas thereto; and
a control system including a plurality of sensors for indicating a level of dissolved oxygen in the water, the control system controlling a flow of oxygen containing gas entering the crown mixing chamber and regulating the level of dissolved oxygen in the water being discharged from the downstream port.

* * * * *